United States Patent [19]
Hughes

[11] 3,710,898
[45] Jan. 16, 1973

[54] DRUM-TYPE BRAKE

[75] Inventor: Michael James Hughes, Birmingham, England

[73] Assignee: Girling Limited

[22] Filed: Jan. 7, 1971

[21] Appl. No.: 104,566

[30] Foreign Application Priority Data

Jan. 13, 1970 Great Britain.....................1,665/70

[52] U.S. Cl. .....................188/79.5 GT, 188/196 BA
[51] Int. Cl. .........................F16d 65/56, F16d 51/52
[58] Field of Search ..........188/79.5 GE, 79.5 GC 79.5 GT, 188/196 BA

[56] References Cited

UNITED STATES PATENTS

| | | | |
|---|---|---|---|
| 3,126,074 | 3/1964 | Swift | 188/79.5 GC |
| 3,169,610 | 2/1965 | Gold | 188/79.5 GT |
| 3,265,161 | 8/1966 | Croissant et al. | 188/79.5 GE |
| 3,339,679 | 9/1967 | Ayers | 188/79.5 GT |

*Primary Examiner*—Duane A. Reger
*Attorney*—Scrivener, Parker, Scrivener & Clarke

[57] ABSTRACT

This invention is concerned with a drum-type brake comprising an actuator engaging one of a pair of brake shoes via an adjuster device of extensible overall length, the adjuster device including a pawl and ratchet mechanism having a pawl carrying lever pivotally mounted on the adjuster body, and a link connected to the lever and operable upon actuation of the actuator to cause angular rotation of the lever which in turn causes the overall length of the adjuster device to increase thereby to take up brake-shoe wear, the link consisting of or including resilient means to limit the force of the pawl acting on the ratchet.

14 Claims, 6 Drawing Figures

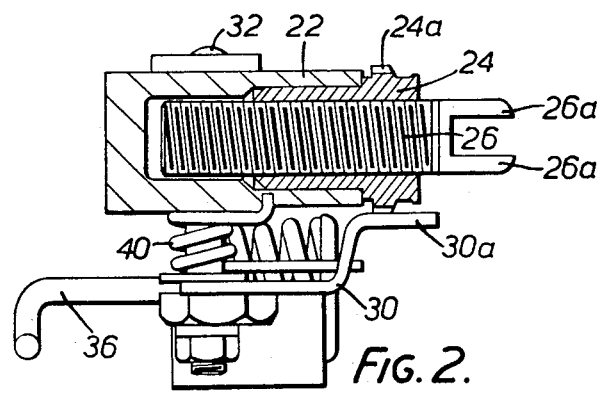
FIG. 2.
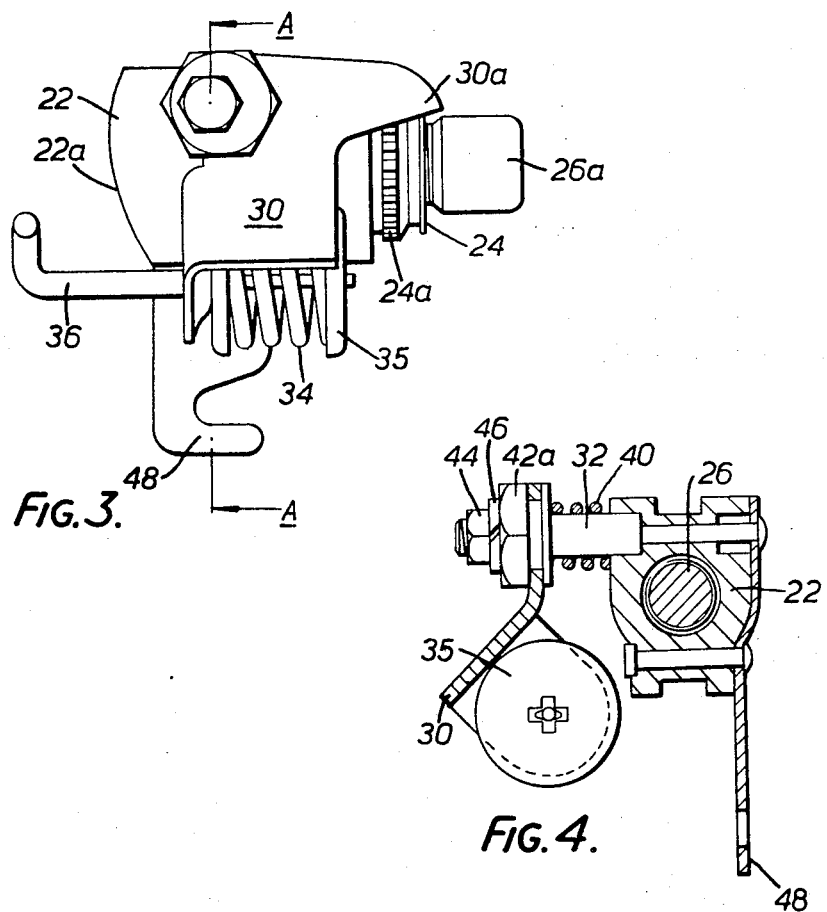
FIG. 3.
FIG. 4.

DRUM-TYPE BRAKE

This invention relates to a drum-type brake in which internal brake shoes are urged radially outwardly into contact with an inwardly facing annular surface of a brake drum to effect braking thereof, and has particular application to drum-type brakes for motor vehicles.

It is an object of the invention to provide a drum-type brake having improved means for automatically adjusting the position of the brake shoes relative to the brake drum to compensate for wear of the brake linings on the brake shoes.

According to the invention, there is provided a drum-type brake comprising a pair of brake shoes, an actuator engaging one of the brake shoes, via an adjuster device of extensible overall length, and operable to urge the shoes apart and into engagement with the braking surface of the drum, the adjuster device including a pawl and ratchet mechanism, a pawl-carrying lever of the mechanism being mounted for angular rotation about a pivot on the body of the adjuster device, and a link extending between and connected to the lever and to a fixed member and operable upon actuation of the actuator to cause angular rotation of the lever which in turn causes the overall length of the adjuster device to increase and thereby to take up brake-shoe wear, the link consisting of or including resilient means to limit the force of the pawl acting on the ratchet.

Embodiments of the invention will now be described by way of example only with reference to the accompanying drawings, in which:

FIG. 2 is a section through the brake shoe adjuster of the brake of FIG. 1, with the adjuster removed from the brake;

FIG. 3 is a side view of the adjuster of FIG. 2;

FIG. 4 is a section on the line A—A of FIG. 3;

Referring to FIGS. 1 to 4 of the drawings, the vehicle drum-type brake includes a brake drum 10, a pair of brake shoes 12, a pair of hydraulically operable piston and cylinder actuator units 14 fixed to a wheel hub back plate (not shown) and operable when the vehicle foot brake is applied to urge the shoes radially outwardly into contact with an inwardly facing annular surface of the brake drum to effect braking of the drum and hence the vehicle, and return coil springs 16 for biasing the brake shoes 12 in a direction away from the inwardly facing surface of the drum to ensure that the brake shoes are retracted from the braking surface of the drum when the vehicle foot brake is released.

Figure 1:
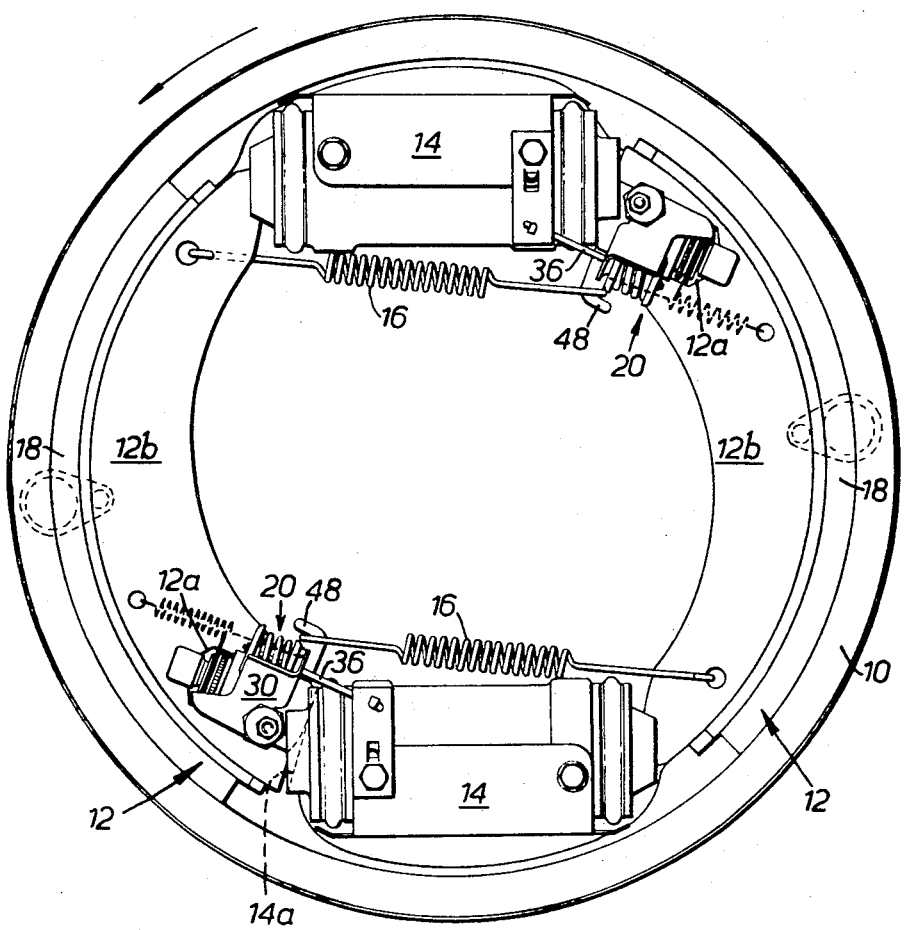
FIG. 1 is a front view of a motor vehicle drum-type brake according to the invention.

To compensate for wear of brake linings 18 on the brake shoes, the brake is provided with a pair of devices 20 which automatically adjust the position of the brake shoes relative to the brake drum, each device 20 engaging the trailing piston of its respective unit 14 considered in the direction of forward rotation indicated by the arrow in FIG. 1. Conveniently, each device 20 includes a block or body 22 slidably mounted in a slot 12a in the web 12b of a respective brake shoe, a sleeve 24 rotatably mounted on the block and a spindle 26 passing through and in screw-threaded engagement with the sleeve 24; the block 22 has a curved end surface 22a rockably supported on an inclined planar end surface 14a of a thrust piston of respective unit 14, and the spindle has spaced lugs 26a engaging opposite faces of web 12b of the brake shoe to prevent rotation of the spindle about its longitudinal axis. Thus by rotating the sleeve 24 in an appropriate direction, the spindle will be moved outwardly of the sleeve 24 and block 22 to increase the overall length of the device 20 to cause the respective brake shoe to be adjustably moved outwardly toward the braking surface of the drum.

To effect rotation of sleeve 22, and hence automatic adjustment of the brake shoe, there is provided a pawl lever 30 mounted on block 22 for pivotal movement about pivot pin 32 and having a pawl portion 30a engaging a ratchet or toothed wheel portion 24a of the sleeve 24. The lever can be rotated, as will be described later, in a direction which in FIG. 1 is clockwise about pin 32, by shoe movement and by a link comprising a compression spring 34 acting between a flange on the lever and a washer 35 secured to a rod 36 which in turn is secured to the cylinder of a respective unit 14; during such rotation, the sleeve 24 is rotated by the lever to extend spindle 26 from the sleeve 24. The lever is biased for rotation in an anti-clockwise direction about pin 32 by a torsion spring 40 surrounding the pin 32 and engaging the lever 30 and block 22. The link including spring 34 also acts to maintain the adjuster device in engagement with its respective thrust piston, and to limit anti-clockwise movement of the lever, the spring rate of spring 40 being less than that of spring 34.

The lever 30 can be adjusted relative to the toothed wheel portion 24a of the sleeve by means of an eccentric 42 rotatably mounted on pin 32 with its longitudinal axis offset from that of the pin (see FIG. 3), the lever 30 being rotatably mounted on the eccentric 42; by appropriate rotation of the eccentric by means of an hexagonal portion 42a of the eccentric the lever can be moved toward or away from the toothed wheel portion 24a. To lock the lever in its adjusted position, a nut 44 is screwed on to a screw-threaded end portion of the pin 32 to clamp against hexagonal portion 42a via a locking washer 46.

The device 20 includes a plate 48 rivetted to block 22 to provide a location for a respective shoe return spring 16, which spring in addition maintains the block 22 in engagement with the piston of respective unit 14.

Operation of the adjusters will now be described.

On application of the vehicle foot brake when the vehicle is being reversed, the pistons of the units 14 will apply braking loads to the brake shoes via the adjuster devices 20. If a sufficient degree of brake lining wear has occurred on a brake shoe, the respective piston and block will move outwardly relative to the cylinder causing the lever 30 to angularly pivot about the above mentioned clockwise direction under the action of rod 36 and spring 34 and in so doing angularly rotate the sleeve 24 by one tooth of portion 24a. Upon release of the vehicle foot brake, the piston and block are retracted under the influence of return springs 16 and the lever 30 is caused to pivot in an anticlockwise direction about pin 32 due to the influence of torsion spring 40 until the pawl portion of the lever engages a new tooth on portion 24a of the sleeve.

Adjustment takes place when the vehicle is being reversed rather than when it is being driven in a forward direction since the friction forces acting on the brake shoes during reverse braking tend to increase the amount that the trailing pistons extend from their respective cylinders and hence the amount that the lever 30 rotates on braking; during forward braking, the friction forces tend to decrease the amount of extensions of the trailing pistons.

The link comprising spring 34 and rod 36 also acts as an overload device during the braking operation to limit by compression of spring 34, the tooth loading on the ratchet portion 24a.

Figure 5:
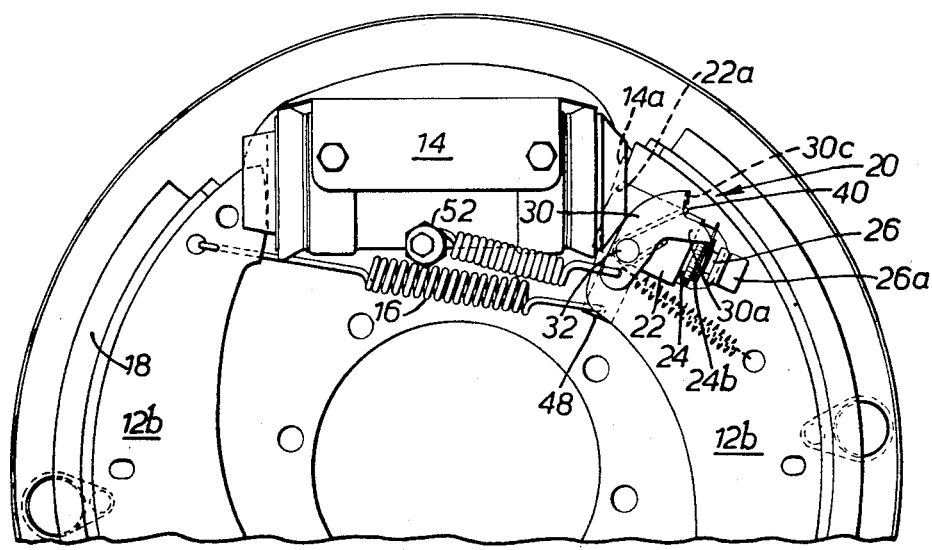
FIG. 5 is an upper part front view of a further embodiment of motor vehicle drum-type brake according to the invention, the lower part view which is substantially identical to the upper part view has been omitted.

The embodiment of FIG. 5 and operation thereof is very similar to that of the previously described embodiment and therefore only the differences in the embodiment of FIG. 5 will now be described; like parts are given the same reference numerals.

The lever 30 is provided with a stop 30c which engages the adjuster body at the maximum angular rotation of the lever to limit the rotation in that direction.

The link is provided by a tension spring 50 having a spring rate greater than that of the spring 40, and the preloading of the spring can be adjusted by an eccentric spindle and lock nut arrangement 52 located at the actuator end of the spring. As in the previous embodiment the link acts as an overload device to limit the tooth loading on the ratchet portion 24b and acts to maintain the adjuster device 20 in engagement with its respective thrust piston and to limit anticlockwise movement of the lever 30.

Figure 6:
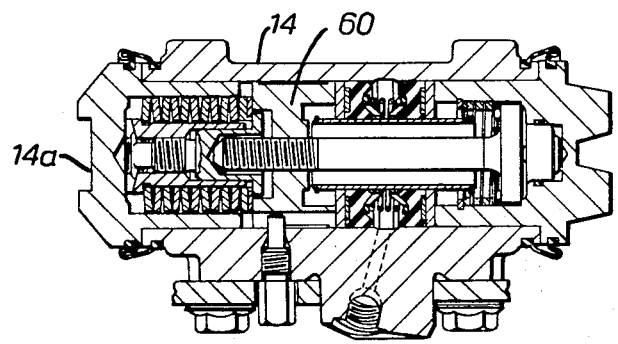
FIG. 6 is a section through a wheel piston and cylinder actuator unit of the brake of FIGS. 1 and 6.

The actuator unit 14, shown in detail in FIG. 6, is the subject of our co-pending British application No. 17692/69 (corresponding U.S. application Ser. No. 24105) and reference is made to that application for a full description of the construction and operation of the actuator. Briefly, the actuator unit is provided internally with an extensible strut 60 which normally follows up brake shoe applying movements of the thrust pistons of the unit and which can be locked in an extended position to hold the shoes applied mechanically after the hydraulic (foot pedal) pressure has been released.

I claim:

1. A drum-type brake comprising a pair of brake shoes, an actuator including a pair of thrust members operable to urge the shoes apart and into engagement with the braking surface of the drum, an adjustable device of extensible overall length interposed between an actuator thrust member and one of said shoes so as to transmit the braking force of said actuator to said shoe through said adjuster device, said adjuster device comprising a pawl and ratchet mechanism including a pawl-carrying lever mounted for angular rotation about a pivot on the body of the adjuster device, and a link including a yielding resilient part coupling the adjuster lever to a fixed part of the brake to provide an actuating stroke of the lever in response to movement of the brake shoe relative to the fixed structure of the brake, said resilient part being constructed and arranged to yield under predetermined force to prevent the application of excessive adjusting forces by said lever to said pawl and ratchet mechanism.

2. A drum-type brake according to claim 1, and including means for limiting the angular rotation of the lever.

3. A drum-type brake according to claim 2, wherein the limiting means includes a stop on the lever engageable with the adjuster body at maximum angular rotation of the lever.

4. A drum-type brake according to claim 1, wherein said fixed member is provided by the actuator.

5. A drum-type brake according to claim 1, wherein the link is operable to maintain the adjuster device in engagement with the thrust member of the actuator.

6. A drum-type brake according to claim 1, wherein the link is provided by a tension coil spring.

7. A drum-type brake according to claim 1, wherein the link is provided by a compression spring acting between a flange on the lever and a washer secured to a rod secured to the actuator.

8. A drum-type brake according to claim 1, and including means for biasing the lever for rotation in a direction about said pivot opposite to that effected by the link.

9. A drum-type brake according to claim 8, wherein the biasing means is a spring of lower spring rate than that of said resilient means of the link.

10. A drum-type brake according to claim 8, wherein the link is operable to limit movement of the lever in said opposite direction.

11. A drum-type brake according to claim 1, wherein the adjuster device includes a body rockably supported on the thrust member of the actuator, a sleeve rotatably mounted on the adjuster body and providing the ratchet of said mechanism, and a non-rotatable spindle engaging the brake shoe and in screw-threaded engagement with the sleeve which surrounds it, rotation of the sleeve in an appropriate direction causing the spindle to move outwardly of the body and sleeve to increase the overall length of the adjuster.

12. A drum-type brake according to claim 1, wherein said pivot includes an eccentric for adjusting the position of the lever relative to the ratchet.

13. A drum-type brake according to claim 1, and including a tension spring connected to, the adjuster device, and to the other of the brake shoes and operable to retract the brake shoes when operation of the actuator ceases.

14. A drum-type brake according to claim 1 and fitted to a wheeled vehicle to effect braking thereof, the adjuster device being disposed at the trailing end of the actuator considered in the direction of forward rotation of its respective wheel.

* * * * *